Oct. 24, 1933.          D. R. STEVENS          1,931,592
                         ELECTRIC CABLE
                       Filed July 3, 1930
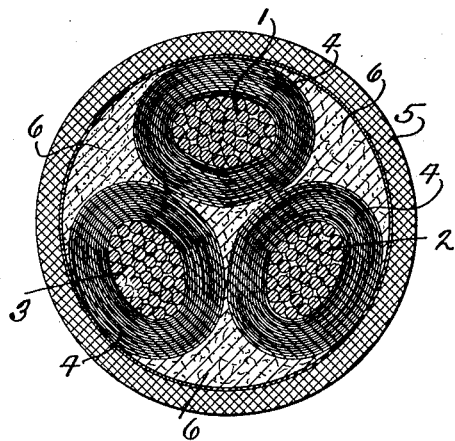
INVENTOR.
Donald R. Stevens
BY
Liddle, Margeson and Horridge
ATTORNEYS.

Patented Oct. 24, 1933

1,931,592

UNITED STATES PATENT OFFICE 1,931,592

ELECTRIC CABLE

Donald R. Stevens, Ridgewood, N. J., assignor to The Okonite-Callender Cable Company, Incorporated, Paterson, N. J., a corporation of New Jersey Application July 3, 1930. Serial No. 465,489

1 Claim. (Cl. 173—266)

This invention relates to an improvement in electric cables and particularly to cables of the multi-conductor type, one of the objects of the invention being the provision of a cable construction in which the filler employed in the voids between the conductors and between the conductors and the outer sheath of the cable is of improved construction, providing a cable which holds more oil or insulating material than cables as heretofore constructed.

A further object is the provision of a cable in which the filler is of such a character that the same will pack better than fillers heretofore employed, and in which the formation of voids and gas pockets will be greatly reduced and the cable as a whole be more flexible than cables as heretofore constructed.

The accompanying drawing shows a cross section of a cable constructed in accordance with the present invention. The cable as will be seen is of the multi-conductor type, comprising three conductors designated 1, 2 and 3, respectively, each conductor, as illustrated, being of the stranded type.

In the manufacture of this type of cable each conductor is insulated by suitable insulation which might be impregnated paper tape, for example, which in the present instance is designated 4. The three conductors are then disposed as shown in the drawing and the voids between the conductors and the voids between the conductors and outer sheath 5, which may be of lead, for example, are filled with a material which is new as a filler in cable construction, to wit, cotton.

This filler I have designated 6. Heretofore it has been customary to employ jute or paper. I have found, however, that cotton packs much better than either of these prior materials, thereby reducing to the minimum the formation of voids and gas pockets, which is of great advantage in cables of this character.

I have found also that the cotton filler provides a more flexible cable than where jute or paper are used, and that the cotton will hold more oil or other insulating material with which the cable is impregnated than will the jute or paper.

I have shown a cable of the sector type merely by way of illustration, it being understood that my invention is applicable to any type of electric cable where a filler is employed between the conductors and the outer covering of the cable and/or between the conductors.

What I claim is:—

An electric power cable comprising a plurality of separately insulated conductors, an enclosing sheath, and a closely packed filler of cotton impregnated with liquid insulation filling the spaces between the insulated conductors and between the insulated conductors and the sheath.

DONALD R. STEVENS.